Aug. 11, 1936.  A. F. SPITZGLASS ET AL  2,050,813
CONTROL APPARATUS
Original Filed July 15, 1929   3 Sheets-Sheet 1

Inventors
Albert F. Spitzglass and
Otto T. Handwerk
by M. W. McConkey
Attorney

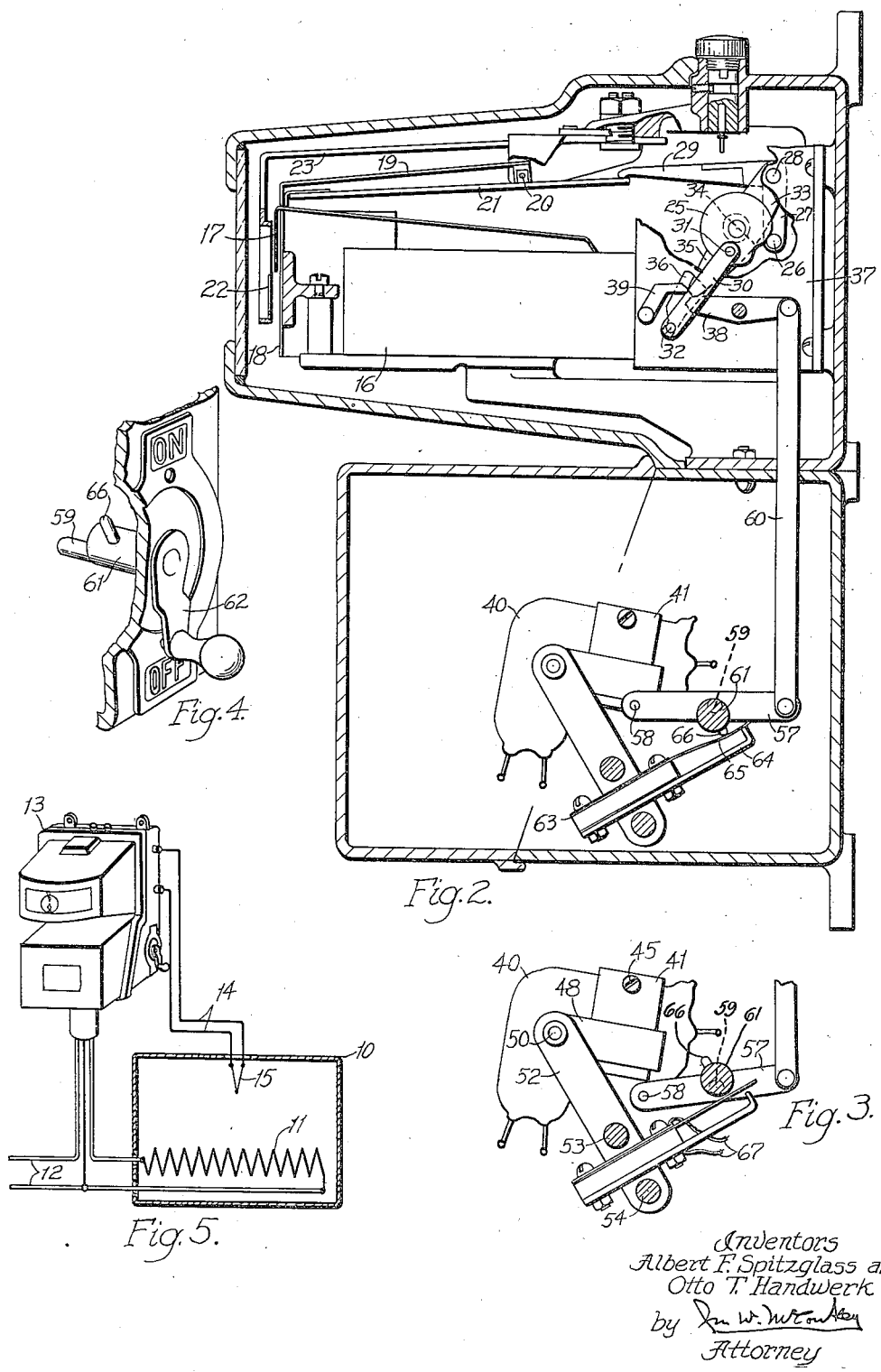

Aug. 11, 1936.  A. F. SPITZGLASS ET AL  2,050,813
CONTROL APPARATUS
Original Filed July 15, 1929  3 Sheets-Sheet 3
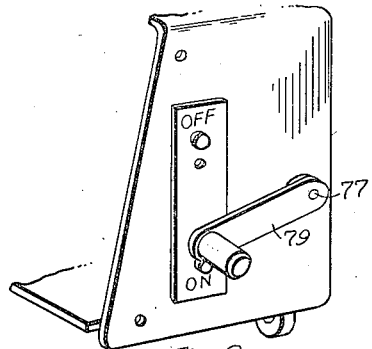
Fig. 8.
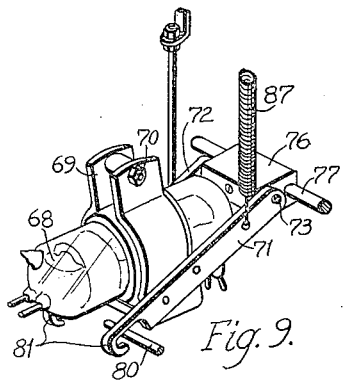
Fig. 9.
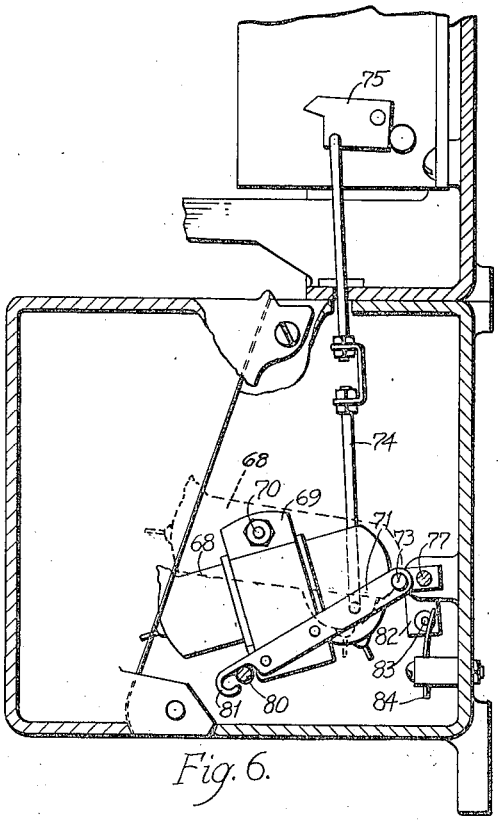
Fig. 6.
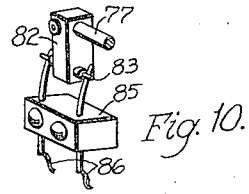
Fig. 10.
Fig. 7.
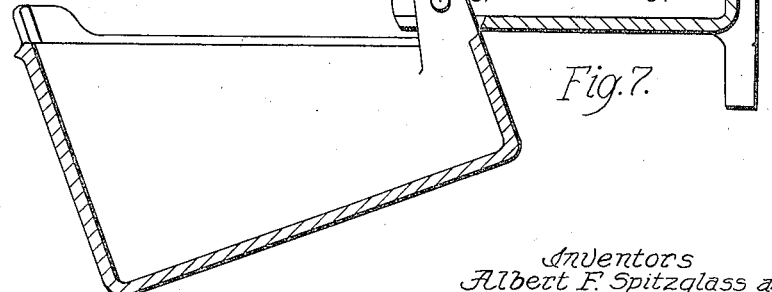
Inventors
Albert F. Spitzglass and
Otto T. Handwerk
by [signature]
Attorney Patented Aug. 11, 1936

2,050,813

UNITED STATES PATENT OFFICE 2,050,813

CONTROL APPARATUS

Albert F. Spitzglass and Otto T. Handwerk, Chicago, Ill., assignors, by mesne assignments, to The Brown Instrument Company, Philadelphia, Pa., a corporation of Pennsylvania Original application July 15, 1929, Serial No. 378,203, now Patent No. 1,949,222, dated February 27, 1934. Divided and this application January 22, 1934, Serial No. 707,714

18 Claims. (Cl. 200—56)

This invention relates to control apparatus and more particularly to apparatus for automatically controlling a condition such, for example, as the heat of an oven or furnace.

The invention is particularly applicable where it is desired to provide automatic means, responsive to a condition to be controlled, for effecting control of the condition, for example to provide automatic means responsive to the temperature in an oven or furnace for controlling such temperature to maintain it at the desired degree. In an installation of this character it may frequently become desirable to discontinue the automatic control so that it may be superseded by manual control, to discontinue operation of the apparatus or for some other purpose, and it is accordingly one of the objects of the invention to provide control apparatus which can be rendered ineffective at will.

Another object is to provide a novel operating member for a control means which can be rendered inoperative at will.

Still another object is to provide a novel mounting for a switch in which the switch can be made ineffective at will.

A further object is to provide a pivoted lever for operating a control means wherein the pivot can be moved to render the lever ineffective to operate the control means.

It is another object of the invention to provide control means having power driven operating means in which the control means and power means can simultaneously be rendered ineffective.

Another object is to provide a novel switch mounting in which the switch can be locked in one position.

Other and further objects of the invention will be apparent from the following detailed description when taken in connection with the accompanying drawings showing one embodiment. It will be understood, however, that the drawings are for purposes of illustration only and are not to be taken as a definition of the scope of the invention, reference being had to the appended claims for this purpose.

In the drawings:

Figure 2 is a side sectional view of the apparatus of Figure 1 with parts in section and parts in elevation;

Figure 3 is a detailed view showing mercury switch operating mechanism;

Figure 4 is a detailed view showing the switch control handle;

Figure 5 is a diagrammatic view illustrating an application of the invention in a controlling system;

Figure 6 is a view similar to Figure 2 illustrating a modification of the invention;

Figure 7 is a view showing the parts in Figure 7 in a different position; and

Figure 1:
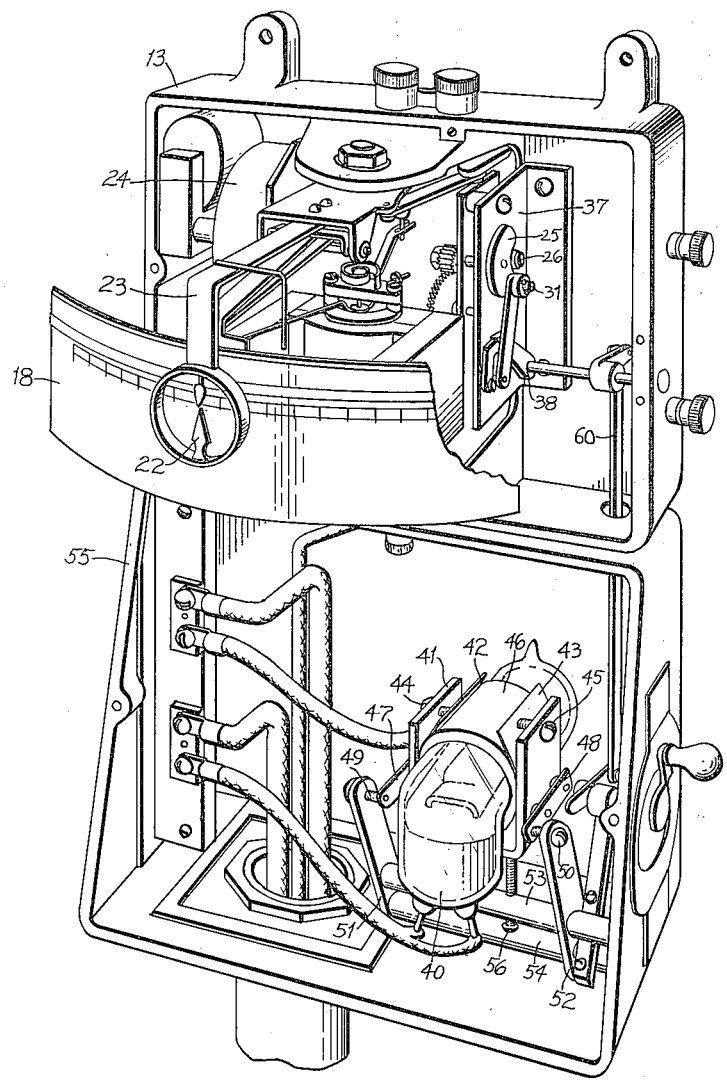
Figure 1 is a perspective view of one embodiment of the invention with parts removed.

Figures 8, 9, and 10 illustrate structural details.

Referring to the drawings and more particularly to Figure 5 there is illustrated a control system with which the present invention may advantageously be employed comprising a furnace or oven 10 provided with a heating element 11 connected to a suitable source of electrical energy through conductors 12. Control apparatus indicated generally at 13 is provided for controlling the current passing through the conductors 12, such control apparatus being operated by the temperature in the furnace or oven 10 through a suitable thermo-couple 15 connected thereto by leads 14.

Referring particularly to Figures 1 and 2, there is shown therein an embodiment of the control apparatus 13 constituted by a galvanometer or millevoltmeter indicated generally at 16 and having an index 17 adapted to swing over a stationary scale 18 mounted in a casing in any suitable manner. A holder 19 suitably pivoted at 20 is provided for pressing the index against the top of the scale 18 and a depressor 21 also pivoted at 20 is adapted to swing across the plane of the index. A target 22 is supported in close proximity to the scale 18 by an arm 23 in a position to cooperate with the index 17 for a purpose which will appear hereinafter.

Means are provided for operating the depressor 21, such means as shown comprising an electric motor 24 operating a cam 25 having a dwell therein and which cooperates with a pin 26 on a bell crank 27 pivoted at 28 and having an arm 29 which bears against the end of depressor 21. These parts are so proportioned that the weight of the depressor constantly tends to raise arm 29 of the bell crank keeping pin 26 in contact with the cam, although this function may obviously be performed by other means such as springs. A link 30 is pivoted on the cam 25 at 31 and carries at its opposite end a pin 32 cooperating with a selector 33 for a purpose to appear hereinafter. The selector 33 is pivoted at its upper end on the pivot 28 and is provided with a pin engaging portion 34 and an elongated cam portion 35 in a position to engage the pin 32 to guide its movement in certain positions thereof. The pin 32 projects through an enlarged opening 36 in a stationary plate 37 and under certain conditions is adapted to engage a pivoted lever 38 to raise the same above the end of a pivoted pawl 39.

The construction and operation of the parts above described is fully set forth in Patent No. 1,949,222 granted February 27, 1934 on an application filed July 15, 1929, of which the present application is a division, and it is accordingly not deemed necessary to describe these parts more in detail in the present application. As pointed out in the above mentioned copending application, when the motor 24 is energized it causes the cam 25 to rotate. Pin 26 rides on the periphery of this cam and when it traverses the dwell therein the depressor 21 dips or beats across the path of the index 17. As the pin 26 rides into the dwell of the cam, it engages the selector 33 and pushes the same to the left as viewed in Figure 2. This moves the selector from the path of pin 32 so that as the cam rotates, pin 32 moves in the opening 36 to the right of the selector as seen in Fig. 2 and engages the pivoted lever 38 raising the same to the dotted line position where it is engaged and held by the pawl 39. As long as the depressor 21 is permitted to move across the plane of the index 17 the selector 33 will be moved to the left so that pin 32 will move up and down to the right thereof and the lever 38 will be in its dotted line position.

When the condition to be controlled changes to such an extent as to move the index 17 opposite the target 22, the index will be in a position to interrupt downward movement of the depressor 21. When this occurs and downward movement of the depressor is arrested the arm 29 of the bell crank is retained in the position shown in full lines in Figure 2 and the pin 26 will not ride into the dwell of the cam 25 sufficiently to contact the selector 33. The selector will therefore remain in the position shown in Figure 2 so that when the pin 32 is raised it will ride up the front thereof and contact with the pawl 39 to raise the same and release lever 38. After the lever 38 is released from the pawl it rests on the pin 32 and as the pin descends, the lever is lowered until it reaches the full line position shown in Figure 2. It will be noted that in this position, so long as the pin 32 moves up the front of cam portion 35 of the selector, pin 32 will not engage lever 38 and the same will remain in the full line position. The target and with it the holder 19 and depressor 21 may be adjusted to control the point at which the index will stop the depressor to adjust the degree at which the condition is to be maintained as fully set forth in the parent application referred to above.

Suitable control means are provided to be operated by the above described mechanism and, as shown, such means is constituted by a mercury switch 40 connected to conductors 12 and mounted in a cradle 41 and retained in position therein by resilient strips 42 and 43, the tops of which are adapted to be pressed inwardly by screws 44 and 45 carried by said cradle to securely clamp the mercury switch therebetween as clearly shown in Figure 1. Before the switch is placed in the cradle a resilient gasket 46 may be placed therearound in a position to receive the pressure of the strips 42 and 43. The cradle 41 is provided with bearing plates 47 and 48 which are rigidly secured thereto and pivoted at 49 and 50 to suitable arms or standards 51 and 52 mounted on horizontally-disposed rods 53 and 54 rigidly secured in an enclosing casing 55. The cradle and bearings therefor are so correlated that when the switch is secured in position in the cradle the axis of the bearings lies slightly to the left of the center of gravity thereof as viewed from Figure 2 and the switch consequently has a tendency to occupy the position shown in Figures 2 and 3 which is the open or off position of the switch. While this construction is practicable and lends itself readily to manufacture and assembly, it will be understood that other mounting means may be employed and that the switch may be biased to off position by other means such as springs, weights, etc. If desired, suitable stop means such, for example, as a screw 56 extending through rod 53 may be provided for contacting with the bottom of the cradle to retain the switch in its correct off position.

Means are provided for operating the switch and, as shown, such means are constituted by a lever 57 suitably pivoted in the casing and carrying a pin 58 adapted to contact the cradle 41 to tilt the switch into its closed or on position. The lever 57 is suitably pivoted on a pivot 59 and is connected at its end to a link 60 which is also pivotally connected to lever 38. It will thus be apparent that when one end of the lever 38 is raised by the pin 32, the right end of lever 57, as viewed in Figure 2, will be depressed and the pin 58 will contact with cradle 41 moving the switch 40 into the position shown in Figure 2.

In order that the automatic control of the switch 40 may be rendered inoperative to be superseded by manual control or for any other desirable purpose, means are provided according to the present invention for rendering the operating mechanism thereof ineffective at will. In the embodiment illustrated in Figures 2, 3, and 4, such means is constituted by a shaft 61 on which the pivot 59 is eccentrically mounted, said shaft being connected to a suitable operating member shown as a handle 62 for rotating the same to move the pivot. When the handle is in the off position shown in Figure 4, the pivot 59 is at the bottom of its arc of movement and occupies the position shown in Figure 3 so that when the link 57 is depressed, the pin 58 moves to the dotted line position in Figure 3 and does not tilt the switch 40 into its closed position. When, however, the handle 62 is moved to its on position, pin 59 is at the top of its arc of movement and the end of lever 57 adjacent the switch will, when raised by depression of link 60, move the switch to its closed position, as indicated in dotted lines in Figure 2.

Means are also provided for rendering the power means 24 inoperative at the same time the switch operating mechanism is rendered ineffective and, as shown, such means is constituted by suitable switch mechanism 63 comprising a rigid arm 64 and a flexible arm 65 insulated therefrom and connected respectively to conductors 67 forming a part of the power circuit for electric motor 24. The shaft 61 is provided with a projecting pin 66 adapted to contact the flexible arm 65 and press it into engagement with the arm 64 when the parts are in the on position as shown in Figure 2. When, however, the parts are in the off position indicated in Figure 3, the flexible arm 65 springs away from the arm 64 interrupting the circuit through leads 67 and cutting off the supply of power to the motor. By this construction, as will be apparent from an inspection of the drawings, the power means is stopped at the same time and by the same means as the switch operating mechanism is rendered ineffective.

Referring now to Figures 6 to 10, inclusive, there is shown a modified form of the invention in which the mercury switch 68 is mounted in a clamp 69 adapted to have its ends drawn together by a bolt 70 to hold the switch in position. Bearing plates 71 and 72 are secured to the clamp 69 and pivoted on suitable pivots at 73. One of said bearing plates 72 is pivoted to an arm 74 connected to a lever 75 corresponding to the lever 38 and operated in a similar manner by the same or similar mechanism. The bearings 73 are mounted in a block 76 secured to a shaft 77 extending through a casing 78 and provided externally of the casing with an operating handle 79 adapted to rotate the shaft and block.

A suitable stop 80, in the form of a rod, is provided in the casing for limiting downward movement of the arms 71 and 72 and said arms are provided with hook portions 81 adapted, when in certain positions, to engage said stop and securely hold the switch in open position as will appear later.

In order to control operation of the power means a block 82 formed of suitable insulating material is mounted on shaft 77 for rotation therewith and carries a pin 83 adapted to engage contact fingers 84 suitably mounted in an insulating block 85 secured to the casing 78, said fingers being attached to leads 86 for supplying current to the electric motor 24.

When the parts are in the on position shown in Fig. 8 and in full lines in Fig. 6, up movement of the member 75 will raise the switch to its dotted line or on position shown in Figure 6. When, however, the lever 79 is moved to its off position, the shaft 77 and blocks 76 and 82 will be moved to the position indicated in Figure 7 wherein the pin 83 is moved away from the fingers 84 to interrupt the circuit to the electric motor and the pivot 73 will be raised moving the hooks 81 into engagement with the stop 80 and raising links 74 and 75. In this position the apparatus is inoperative and the switch is securely locked in its off position. This feature is very desirable as it enables the switch to be secured in one position thereby avoiding possible injury incident to rough handling as in shipping.

If desired, a suitable spring 87 may be provided to relieve the pivot pins 73 of some of the weight of the mercury switch and its supporting mechanism.

From the above description it will be apparent that there is provided by the present invention a novel control apparatus for controlling a condition, which may be rendered inoperative or ineffective at will and one in which both the control means and a power driven operating means for the same can simultaneously be rendered ineffective. There is also provided a novel switch mounting in which the switch can be locked in one position to prevent operation thereof and damage incident to rough handling.

While only two embodiments of the present invention have been shown and described, it will be apparent to those skilled in the art that many changes might be made therein without departing from the scope of the invention. Reference will, therefore, be had to the appended claims for a definition of the limits of the invention.

What is claimed is:

1. In control apparatus, the combination with means responsive to changes in a control quantity, of a control device, means through which the first mentioned means controls said device, the last mentioned means comprising a normally energized power actuator and a power transmitting connection, and means operable at will for simultaneously deenergizing said actuator and rendering said connection inoperative.

2. In control apparatus, the combination with means responsive to changes in a control quantity, of a control device, means through which the first mentioned means controls said device, the last mentioned means comprising a normally energized power actuator and a power transmitting connection including a lever, and means operable at will for simultaneously deenergizing said actuator and adjusting said lever to render said connection inoperative.

3. In a control system for an electric heating unit, the combination of a pivotally mounted mercury switch, a lever adapted to oscillate said switch for controlling the temperature of the unit, operating means actuable in accordance with the temperature of the unit for operating said lever, electrically operated power means for driving the operating means, a switch for controlling the operation of the power means, and a single means, operable at will, for varying the fulcrum of the lever to render the operating means ineffective and to open the power switch to discontinue operation of the power means.

4. A control apparatus for a heating circuit, comprising a casing containing an instrument having a temperature responsive index and means controlled in accordance with the position of said index and adapted to be opened to permit access to said instrument, a second casing containing a mercury switch connected in series in the heating circuit to control the same and containing a movable member for actuating said switch, and a power transmitting connection between said means and said member for actuating said switch in accordance with the position of the index and comprising one portion within one, and a second portion within the other of said two casings.

5. In a control apparatus, a cradle for a mercury switch, a stop against which the cradle rests in one position, said cradle and stop having normally spaced interengaging portions and means for causing said portions to cooperate to hold the cradle in fixed position against said stop.

6. In a control apparatus, a pivotally mounted cradle for a mercury switch, a stop for said cradle when in one position, said cradle and stop having normally spaced interengaging portions and means for shifting said cradle whereby to bring said portions into cooperation to lock the cradle to the stop.

7. In a control apparatus, a cradle for a mercury switch including spaced side members and clamping means for holding a switch, a shiftable support, said members pivoted at one end to said support and having hooked portions at the other end, a stop normally supporting said members and means to shift the support to bring the hooked portions of the members into interlocking engagement with the stop to lock the cradle against movement.

8. Control apparatus comprising an index movable in response to a condition to be controlled, a member selectively movable into predetermined positions according to the position of said index, a pivoted lever operably connected to said member, control means movable by said lever, and means for moving the pivot of said lever to render said lever ineffective to move the control means.

9. Control apparatus comprising an index movable in response to a condition to be controlled, a member selectively movable into predetermined positions according to the position of said index, a lever mounted on an eccentric pivot, control means movable by said lever, and means for rotating said eccentric pivot to render the lever ineffective to move the control means.

10. In a control system control means for controlling a condition, a member movable about a pivot for actuating said control means, power driven operating means for moving said member, and means for moving said pivot for simultaneously rendering said member ineffective to actuate the control means and stop said power driven operating means.

11. A control mechanism comprising a tiltable switch, an adjacent switch having terminals one of which is yielding to be movable to engage and disengage the other, a lever for operating the tiltable switch having a fulcrum movable to two positions, and means for shifting said fulcrum and simultaneously operating said yielding terminal.

12. A control mechanism comprising a tiltable switch, an adjacent switch having terminals one of which is yielding to be movable to engage and disengage the other, a lever for operating the tiltable switch having a fulcrum movable to two positions, and a rock member for shifting said fulcrum having a projection engageable with said yielding terminal.

13. A control mechanism comprising a tiltable switch, an adjacent stationary switch, a lever for tilting said first switch, and a rock member having eccentrically arranged thereon a fulcrum for said lever and having a projection arranged to operate said adjacent switch.

14. A control mechanism comprising a switch mounted on a lever pivoted at one end and formed with an elongated opening at the other end, a stop in said opening, and an operating link connected to said lever between its ends.

15. A control mechanism comprising a switch mounted on a lever having a pivot at one end and formed with an elongated opening at the other end, a stop in said opening, an operating link connectd to said lever between its ends, and means for shifting said pivot until the stop engages one end of said opening and thereby rendering said switch ineffective.

16. A control mechanism comprising a switch mounted on a lever having a pivot at one end and an operating connection between its ends and a hook-shaped projection at its other end, a stop adjacent said projection, and means for shifting said pivot in such a manner as to cause engagement and disengagement of said projection and said stop.

17. A control mechanism comprising a switch mounted on a lever having a pivot at one end and formed with an elongated opening at the other end, a stop in said opening, an operating link connected to said lever between its ends, and means for shifting said pivot until the stop engages one end of said opening and thereby rendering said switch ineffective, together with a second switch operated by the shifting of said pivot.

18. A control mechanism comprising a switch mounted on a lever having a pivot at one end and an operating connection between its ends and a hook-shaped projection at its other end, a stop adjacent said projection, and means for shifting said pivot in such a manner as to cause engagement and disengagement of said projection and said stop, together with a second switch operated by the shifting of said pivot.

ALBERT F. SPITZGLASS.
OTTO T. HANDWERK.